United States Patent
Zheng

(10) Patent No.: US 11,662,497 B2
(45) Date of Patent: May 30, 2023

(54) DETECTING DRILL PIPE CONNECTION JOINTS VIA MAGNETIC FLUX LEAKAGE

(71) Applicant: Schlumberger Technology Corporation, Sugar Land, TX (US)

(72) Inventor: Shunfeng Zheng, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 187 days.

(21) Appl. No.: 17/115,202

(22) Filed: Dec. 8, 2020

(65) Prior Publication Data

US 2022/0179120 A1    Jun. 9, 2022

(51) Int. Cl.
| | |
|---|---|
| *E21B 47/09* | (2012.01) |
| *G01V 3/26* | (2006.01) |
| *G01V 3/38* | (2006.01) |
| *E21B 19/16* | (2006.01) |
| *E21B 33/06* | (2006.01) |
| *E21B 33/08* | (2006.01) |

(52) U.S. Cl.
CPC .............. *G01V 3/26* (2013.01); *E21B 19/161* (2013.01); *E21B 19/165* (2013.01); *G01V 3/38* (2013.01); *E21B 33/06* (2013.01); *E21B 33/085* (2013.01)

(58) Field of Classification Search
CPC ...... E21B 19/161; E21B 19/165; E21B 33/06; E21B 33/085; G01V 3/26; G01V 3/38
See application file for complete search history.

(56) References Cited

U.S. PATENT DOCUMENTS

| | | | | |
|---|---|---|---|---|
| 5,589,775 A | * | 12/1996 | Kuckes | ............... E21B 47/0228 175/45 |
| 2014/0000900 A1 | * | 1/2014 | Leiper | ................... E21B 17/006 166/173 |
| 2015/0345285 A1 | | 12/2015 | Lauf | |

(Continued)

FOREIGN PATENT DOCUMENTS

| | | |
|---|---|---|
| WO | 0060343 A1 | 10/2000 |
| WO | 2012174057 A1 | 12/2012 |

OTHER PUBLICATIONS

"Magnetic Flux Leakage Measurement Technology" [https://www.rosen-group.com/global/company/explor/we-can/technologies/measurement/mfl.html], accessed Jan. 25, 2021, 2 pages.

(Continued)

*Primary Examiner* — Son T Le
*Assistant Examiner* — Adam S Clarke
(74) *Attorney, Agent, or Firm* — Jeffrey D. Frantz

(57) ABSTRACT

An apparatus and methods for detecting drill pipe connection joints via magnetic flux leakage. An apparatus may include a magnet operable to magnetize a portion of a drill string extending out of a wellbore that extends into a subterranean formation below a drill rig and a sensor operable to facilitate magnetic flux measurements indicative of an amount of magnetic flux that leaked from the drill string along the magnetized portion of the drill string. The apparatus may further comprise a processing device having a processor and a memory storing a computer program code, wherein the processing device is operable to receive the magnetic flux measurements and detect a connection joint between adjacent drill pipes of the drill string based on the magnetic flux measurements.

20 Claims, 7 Drawing Sheets

(56) References Cited

U.S. PATENT DOCUMENTS

2017/0081954 A1    3/2017  Dewald et al.
2020/0224523 A1    7/2020  Parmeshwar et al.

OTHER PUBLICATIONS

"CoilScan Engineered Pipe Management Service", [https://www.slb.com/well-intervention/coiled-tubing-intervention/surface-equipment/coilscan-pipe-management-service] accessed Jan. 25, 2021, 5 pages.
Search Report and Written Opinion of International Patent Application No. PCT/US2021/072747 dated Mar. 28, 2022, 12 pages.

* cited by examiner

DETECTING DRILL PIPE CONNECTION JOINTS VIA MAGNETIC FLUX LEAKAGE

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a well construction system (i.e., a drilling rig) having various surface and subterranean well construction equipment being operated in a coordinated manner. For example, a surface driver (e.g., a top drive and/or a rotary table) and/or a downhole mud motor can be utilized to rotate and advance a drill string into a subterranean formation to drill a wellbore. The drill string may include a plurality of drill pipes coupled together and terminating with a drill bit. Length of the drill string may be increased by connecting additional drill pipes to the drill string while depth of the wellbore increases. Drilling fluid may be pumped from the wellsite surface down through the drill string to the drill bit. The drilling fluid lubricates and cools the drill bit and carries drill cuttings from the wellbore back to the wellsite surface. The drilling fluid returning to the surface may then be cleaned and again pumped through the drill string. The well construction equipment may be monitored and controlled by corresponding local controllers and/or a remotely located central controller. Some of the well construction operations performed by the well construction equipment may also or instead be monitored and controlled manually by a human operator (e.g., a driller) via a control workstation located within a control center.

Automating connection and disconnection of drill pipes to and from the drill string relies on accurate measurements of stickup height of the drill string. When a measurement of stickup height is inaccurate, a driller has to manually adjust height of an iron roughneck before the iron roughneck can connect or disconnect (i.e., make up or break out) a drill pipe to or from the drill string. The manual adjustment introduces a delay to the well construction operations (e.g., drilling, tripping, etc.).

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a magnet to magnetize a portion of a drill string extending out of a wellbore. The wellbore extends into a subterranean formation below a drill rig. The apparatus also includes a sensor to facilitate magnetic flux measurements indicative of an amount of magnetic flux that leaked from the drill string along the magnetized portion of the drill string. The apparatus also includes a processing device having a processor and a memory storing a computer program code. The processing device receives the magnetic flux measurements and detects a connection joint between adjacent drill pipes of the drill string based on the magnetic flux measurements.

The present disclosure also introduces a method that includes, while a drill string is moved into and out of a wellbore, transmitting magnetic flux through a portion of the drill string, measuring leakage of the magnetic flux along the portion of the drill string, and detecting a connection joint between adjacent drill pipes of the drill string based on a change in the measured leakage of the magnetic flux.

The present disclosure also introduces an apparatus that includes magnets disposed with respect to a rig floor of a drill rig such that a drill string can move into and out of a wellbore between the magnets. The magnets transmit a magnetic flux through a portion of the drill string while the drill string is moved into and out of the wellbore. The apparatus also includes a magnetic flux sensor disposed such that the drill string can move into and out of the wellbore adjacent the magnetic flux sensor. The magnetic flux sensor facilitates magnetic flux measurements indicative of an amount of magnetic flux that leaked from the portion of the drill string through which the magnetic flux is transmitted while the drill string is moved into and out of the wellbore. The apparatus also includes a block position sensor facilitating block position measurements, as well as a processing device having a processor and a memory storing a computer program code. The processing device receives the magnetic flux measurements, detects a connection joint between adjacent drill pipes of the drill string based on the magnetic flux measurements, receives the block position measurements, and determines a stickup height of the drill string based on the predetermined height of the magnetic flux sensor and the block position measurements.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
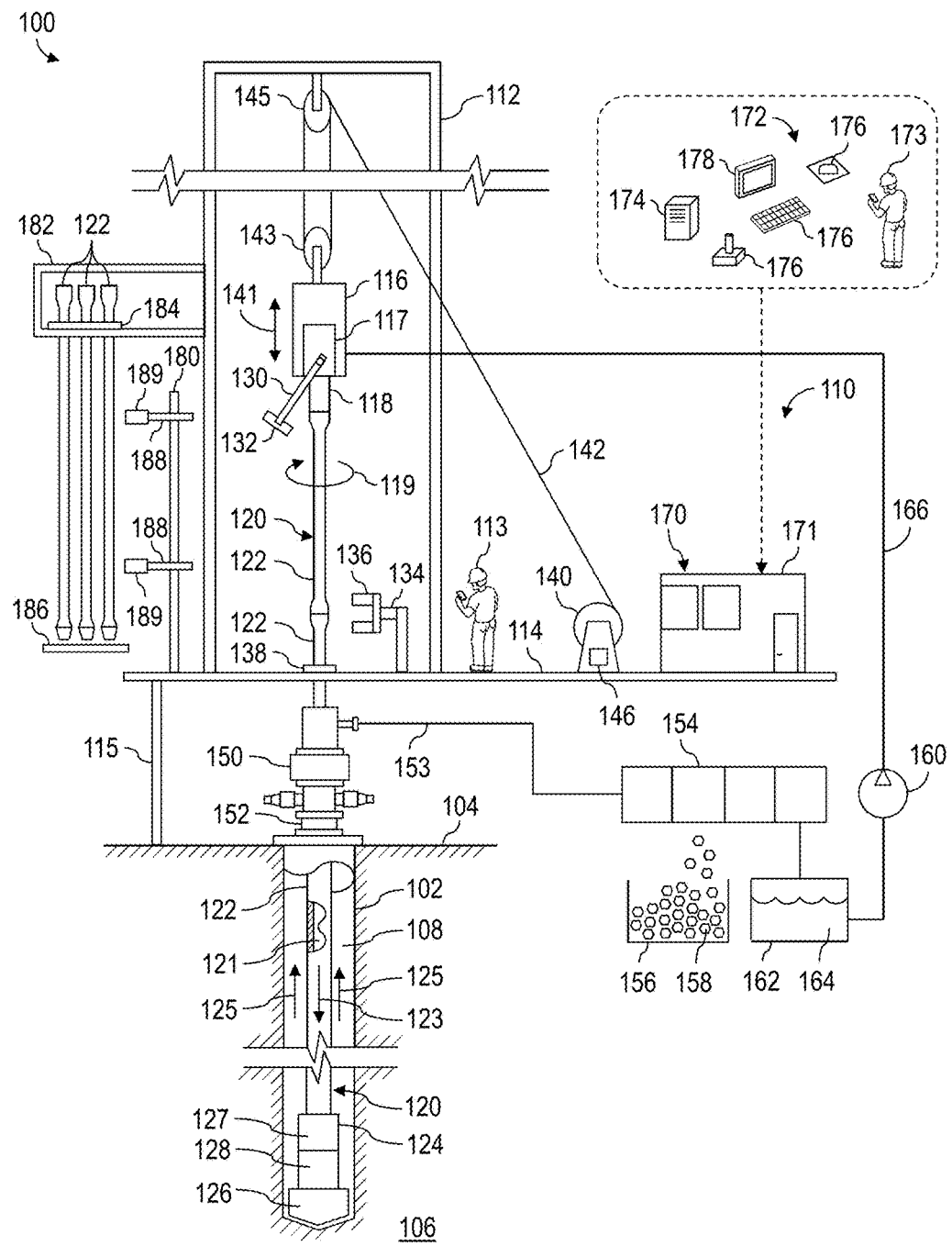
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods (e.g., processes, operations, etc.) according to one or more aspects of the present disclosure may be used or performed in association with a well construction system at a wellsite, such as for constructing a wellbore to obtain hydrocarbons (e.g., oil and/or gas) or other natural resources from a subterranean formation. A person having ordinary skill in the art will readily understand that one or more aspects of systems and methods disclosed herein may be utilized in other industries and/or in association with other systems.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a well construction rig (i.e., a drilling rig) and associated equipment collectively operable to construct (e.g., drill) a wellbore 102 extending from a wellsite surface 104 into a subterranean formation 106 via rotary and/or directional drilling. Although the well construction system 100 is depicted as an onshore implementation, the aspects described below are also applicable or readily adaptable to offshore implementations.

The well construction system 100 comprises well construction equipment, such as surface equipment 110 located at the wellsite surface 104 and a drill string 120 suspended within the wellbore 102. The surface equipment 110 may include a support structure 112 (e.g., a mast or derrick) disposed over a rig floor 114. The drill string 120 may be suspended within the wellbore 102 from the support structure 112. The support structure 112 and the rig floor 114 may be collectively supported over the wellbore 102 by support members 115 (e.g., legs). Certain pieces of the surface equipment 110 may be manually operated (e.g., by hand, via a local control panel, etc.) by rig personnel 113 (e.g., a roughneck or another human rig operator) located at various locations (e.g., rig floor 114) of the well construction system 100.

The drill string 120 may comprise a bottomhole assembly 124 (BHA) and tubulars 122 for conveying the BHA 124 within the wellbore 102. The tubulars 122 may be or comprise drill pipe, including heavy-weight drill pipe (HWDP), wired drill pipe (WDP), tough logging condition (TLC) pipe, drill collars, and/or other drill tubulars. A lower (i.e., downhole) end of the BHA 124 may be or comprise a drill bit 126. The BHA 124 may comprise one or more downhole tools 127 and/or a mud motor 128 above the drill bit 126. Rotation of the drill bit 126 and the weight of the drill string 120 may collectively operate to form the wellbore 102. The drill string 120, including the drill bit 126, may be rotated 119 by a top drive 116 connected to an upper end of the drill string 120.

The top drive 116 may comprise a drive shaft 118 operatively connected with an electric motor 117. The drive shaft 118 may be selectively coupled with the upper end of the drill string 120, and the motor 117 may be selectively operated to rotate 119 the drive shaft 118 to rotate the drill string 120. The top drive 116 may further comprise a grabber, a swivel (neither shown), elevator links 130 terminating with an elevator 132. The grabber may include a clamp that clamps onto a tubular 122 when connecting the tubular 122 to or disconnecting the tubular 122 from the drill string 120. The elevator links 130 and the elevator 132 may be used to lift the drill sting 120 and tubulars 122 that are not mechanically coupled to the drive shaft 118. For example, when the drill string 120 is being deployed into or out of the wellbore 102, the elevator 132 may grasp the upper end of the drill string 120 such that the drill string 120 can be raised and lowered when the top drive 116 is raised and lowered.

The top drive 116 may be suspended from (supported by) the support structure 112 via a hoisting system operable to impart vertical motion 141 to the top drive 116, and thus the drill string 120 and disconnected tubulars 122 suspended from (e.g., connected to) the top drive 116. During drilling operations, the top drive 116, in conjunction with operation of the hoisting system, may advance the drill string 120 into the formation 106 to form the wellbore 102. The hoisting system may comprise a traveling block 143, a crown block 145, and a drawworks 140 storing a flexible line 142 (e.g., a cable, a wire rope, etc.). The crown block 145 may be connected to and thus supported by the support structure 112, and the traveling block 143 may be connected to and thus support the top drive 116. The drawworks 140 may be mounted to the rig floor 114. The crown block 145 and traveling block 143 may each comprise pulleys or sheaves around which the flexible line 142 is reeved to operatively connect the crown block 145, the traveling block 143, and the drawworks 140. The drawworks 140 may selectively impart tension to the flexible line 142 to lift and lower the top drive 116, resulting in the vertical motion 141 of the top drive 116 and the drill string 120 (when connected with the top drive 116). For example, the drawworks 140 may be operable to reel in the flexible line 142, causing the traveling block 143 and the top drive 116 to move upward. The drawworks 140 may be further operable to reel out the flexible line 142, causing the traveling block 143 and the top drive 116 to move downward.

The drill string hoisting system may further comprise a position sensor 146 operable to output or otherwise facilitate position data (i.e., position measurements) indicative of position of a predetermined portion of the hoisting system. The position sensor 146 may be or comprise a rotational position sensor disposed or installed in association with, for example, a drum of the drawworks 140. The position sensor 146 may thus be operable to output or otherwise facilitate position data indicative of rotational position of the drum. The position data may be indicative of block position, which may be or comprise position of the traveling block 143 or another portion of the drill string hoisting system (e.g., the top drive 116) supported by the traveling block 143. The position sensor 146 may thus be referred to as a block position sensor, and the position data may thus be referred to as block position data. The position data may be further indicative of rotational speed of the drum, and thus indicative of linear speed of the traveling block 143 and the drill string 120. The position data may be further indicative of rotational acceleration of the drum, and thus linear acceleration of the traveling block 143 and the drill string 120. The position sensor 146 may be or comprise, for example, an encoder, a rotary potentiometer, or a rotary variable-differential transformers (RVDTs).

An iron roughneck 134 may be positioned on the rig floor 114. The iron roughneck 134 may comprise a torqueing portion 136, such as may include a spinner and a torque wrench comprising a lower tong and an upper tong. The torqueing portion 136 of the iron roughneck 134 may be moveable toward and at least partially around the drill string 120, such as may permit the iron roughneck 134 to make up and break out threaded connection joints between adjacent tubulars 122 of the drill string 120. The torqueing portion 136 may also be moveable away from the drill string 120, such as may permit the iron roughneck 134 to move clear of the drill string 120 during drilling operations. The spinner of the iron roughneck 134 may be utilized to apply low torque to make up and break out the connection joints between tubulars 122 of the drill string 120, and the torque wrench may be utilized to apply a higher torque to tighten and loosen the connection joints.

A set of slips 138 may be located on the rig floor 114, such as may accommodate the drill string 120 during drill string make up and break out operations, drill string running operations, and drilling operations. The slips 138 may be in an open position to permit advancement of the drill string 120 within the wellbore 102 by the hoisting system, such as during the drill string running operations and the drilling operations. The slips 138 may be in a closed position to clamp the upper end (i.e., an uppermost tubular 122) of the drill string 120 to thereby suspend and prevent advancement of the drill string 120 within the wellbore 102, such as during the make up and break out operations.

The hoisting system may deploy the drill string 120 into the wellbore 102 through well control equipment 150 for maintaining well pressure control and controlling fluid being discharged from the wellbore 102. The well control equipment 150 may be mounted on top of a wellhead 152 installed over the wellbore 102.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 162 holding the drilling fluid 164 (i.e., drilling mud). The drilling fluid circulation system may comprise one or more pumps 160 operable to move the drilling fluid 164 from the container 162 into the fluid passage 121 of the drill string 120 via a fluid conduit 166 (e.g., a stand pipe) extending from the pump 160 to the top drive 116 and an internal passage (not shown) extending through the top drive 116.

During drilling operations, the drilling fluid may continue to flow downhole 123 through the internal passage 121 of the drill string 120. The drilling fluid may exit the BHA 124 via ports in the drill bit 126 and then circulate uphole 125 through an annular space 108 of the wellbore 102. In this manner, the drilling fluid lubricates the drill bit 126 and carries formation cuttings uphole 125 to the wellsite surface 104. The drilling fluid flowing uphole 125 toward the wellsite surface 104 may exit the wellbore 102 via one or more instances of the well control equipment 150. The drilling fluid may then pass through one or more fluid conduits 153 (e.g., a gravity line) and drilling fluid reconditioning equipment 154 to be cleaned and reconditioned before returning to the fluid container 162. The drilling fluid reconditioning equipment 154 may also separate drill cuttings 158 from the drilling fluid into a cuttings container 156.

The surface equipment 110 may include tubular handling equipment collectively operable to store, move, connect, and disconnect the tubulars 122 to assemble and disassemble the drill string 120. For example, a catwalk (not shown) may be utilized to convey tubulars 122 from a ground level, such as along the wellsite surface 104, to the rig floor 114, permitting the elevator 132 to grab and lift the tubulars 122 above the wellbore 102 for connection with the drill string 120. The tubular handling equipment may further include a tubular handling device (THD) 180 disposed in association with a vertical pipe rack 182 for storing the conveyance tubulars 122. The vertical pipe rack 182 may comprise or support a fingerboard 184 defining a plurality of slots configured to support or otherwise hold the tubulars 122 within or above a setback 186 (e.g., a platform or another area) located adjacent to, along, or below the rig floor 114. The fingerboard 184 may comprise a plurality of fingers (not shown), each associated with a corresponding slot and operable to close around and/or otherwise interpose individual tubulars 122 to maintain the tubulars 122 within corresponding slots of the fingerboard 184. The vertical pipe rack 182 may be connected with and supported by the support structure 112 or another portion of the well construction system 100. The fingerboard 184/setback 186 provide storage (e.g., a temporary storage) of tubulars 122 during various operations, such as during and between tripping operations of the drill string 120. The THD 180 may be operable to transfer the tubulars 122 between the fingerboard 184/setback 186 and the drill string 120 (i.e., space above the suspended drill string 120). For example, the THD 180 may include arms 188 terminating with clamps 189, such as may be operable to grasp and/or clamp onto one of the tubulars 122. The arms 188 of the THD 180 may extend and retract, and/or at least a portion of the THD 180 may be rotatable and/or movable toward and away from the drill string 120, such as may permit the THD 180 to transfer a tubular 122 between the fingerboard 184/setback 186 and the drill string 120.

During drilling operations, the well construction equipment of the well construction system 100 may progress through a plurality of coordinated well construction operations (i.e., operational sequences) to drill or otherwise construct the wellbore 102. The well construction operations may change based on a digital drilling program, status of the well, status of the subterranean formation, stage of drilling operations (e.g., tripping, drilling, tubular handling, etc.), and type of downhole tubulars 122 utilized, among other examples.

During drilling operations, the hoisting system may lower the drill string 120 while the top drive 116 rotates the drill string 120 to advance the drill string 120 downward within the wellbore 102 and into the formation 106. During the advancement of the drill string 120, the slips 138 are in an open position, and the iron roughneck 134 is moved away or is otherwise clear of the drill string 120. When the upper end of the drill string 120 (i.e., upper end of the uppermost tubular 122 of the drill string 120) connected to the drive shaft 118 is near the slips 138 and/or the rig floor 114, the top drive 116 may cease rotating the drill string 120 and the slips 138 may close to clamp the upper end of the drill string 120. The grabber of the top drive 116 may then clamp the uppermost tubular 122 connected to the drive shaft 118, and the drive shaft 118 may rotate in a direction reverse from the drilling rotation to break out the connection between the drive shaft 118 and the uppermost tubular 122. The grabber of the top drive 116 may then release the uppermost tubular 122.

A new tubular 122 may then be conveyed by the catwalk until the box end of the tubular 122 projects above the rig floor 114. The elevator 132 of the top drive 116 may then grasp the protruding new tubular 122, and the drawworks 140 may be operated to lift the top drive 116, the elevator 132, and the new tubular 122. The hoisting system may then raise the top drive 116, the elevator 132, and the new tubular 122 until the lower end (pin end) of the new tubular 122 is axially aligned with the upper end (box end) of the drill string 120 clamped by the slips 138. The iron roughneck 134 may be moved toward the drill string 120, and the lower tong of the torqueing portion 136 clamps onto the upper end of the drill string 120. The spinner of the iron roughneck 134 may then threadedly connect the lower end of the new tubular 122 with the upper end of the drill string 120. The upper tong of the iron roughneck 134 may then clamp onto the new tubular 122 and rotate with high torque to complete making up a connection (i.e., forming a connection joint) between the new tubular 122 and the drill string 120. In this manner, the new tubular 122 becomes part of the drill string 120. The iron roughneck 134 may then release the drill string 120 and move clear of the drill string 120.

The grabber of the top drive 116 may then clamp onto the drill string 120. The drive shaft 118 may then be lowered into contact with the upper end of the drill string 120 (e.g., the upper end of the newly connected tubular 122) and rotated to make up a connection between the drill string 120 and the drive shaft 118. The grabber may then release the drill string 120, and the slips 138 may be moved to the open position. The drilling operations may then resume.

To trip out the drill string 120, the top drive 116 and the connected drill string 120 may be raised and the slips 138 may be closed around the drill string 120. The elevator 132 may be closed around the drill string 120 and the grabber may clamp the uppermost tubular 122 of the drill string 120. The drive shaft 118 may then be rotated in a direction reverse from the drilling rotation to break out the connection between the drive shaft 118 and the drill string 120. The grabber may then release the uppermost tubular 122 of the drill string 120 and the elevator 132 closed around the drill string 120. The iron roughneck 134 may then be moved toward the drill string 120, the upper tong may clamp onto the uppermost tubular 122 of the drill string 120, and the lower tong may clamp onto a lower tubular 122 of the drill string 120. The upper tong may then rotate the uppermost tubular 122 to provide a high torque to break out the connection between the uppermost tubular 122 and the lower tubular 122. The spinner may then rotate the uppermost tubular 122 to disconnect the uppermost tubular 122 from the rest of the drill string 120 such that the disconnected uppermost tubular 122 is suspended above the rig floor 114 by the elevator 132. The iron roughneck 134 may then release the drill string 120 and move clear of the drill string 120.

The THD 180 may then move toward the drill string 120 to grasp the disconnected tubular 122 suspended from the elevator 132 with the clamps 189 and the elevator 132 may then open to release the tubular 122. The THD 180 may move away from the drill string 120 while grasping the tubular 122, place the tubular 122 in the fingerboard 184/setback 186, and release the tubular 122 for storage. This process may be repeated until the intended length of drill string 120 is removed from the wellbore 102.

The surface equipment 110 of the well construction system 100 may also comprise a control center 170 from which various equipment and equipment subsystems of the well construction system 100 may be monitored and controlled. Equipment subsystems may include a drill string rotation system (e.g., the top drive 116), a hoisting system (e.g., the drawworks 140, the line 142, and the blocks 143, 145), a tubular handling system (e.g., the catwalk, the iron roughneck 134, the THD 180, etc.), a drilling fluid circulation system (e.g., one or more mud pumps 160, the drilling fluid container 162, and the fluid conduit 166), a drilling fluid cleaning and reconditioning system (e.g., the fluid cleaning and reconditioning equipment 154), a well control system (e.g., the well control equipment 150), and the BHA 124, among other examples. The control center 170 may be located on the rig floor 114. The control center 170 may comprise a facility 171 (e.g., a room, a cabin, a trailer, etc.) containing a control workstation 172, which may be operated by rig personnel 173 (e.g., a driller or another human rig operator) to monitor and control various equipment and equipment subsystems of the well construction system 100.

The control workstation 172 may comprise or be communicatively connected with a central control device 174 (e.g., a processing device, an equipment controller, etc.), such as may be operable to receive, process, and output information to monitor operations of and/or provide control to one or more portions of the well construction system 100. For example, the control device 174 may be communicatively connected with the various surface equipment 110 and/or the BHA 124, and may be operable to receive sensor signals (e.g., sensor measurements and/or other data) from and transmit signals (e.g., control commands, signals, and/or other data) to such equipment to perform various operations described herein. The control device 174 may store executable program code, instructions, and/or operational parameters or setpoints, including for implementing one or more aspects of operations described herein. The control device 174 may be located within and/or outside of the facility 171.

The control workstation 172 may be operable for entering or otherwise communicating control commands to the control device 174 by the rig personnel 173, and for displaying or otherwise communicating information from the control device 174 to the rig personnel 173. The control workstation 172 may comprise one or more input devices 176 (e.g., a keyboard, a mouse, a joystick, a touchscreen, etc.) and one or more output devices 178 (e.g., a video monitor, a touchscreen, a printer, audio speakers, etc.). Communication between the control device 174, the input and output devices 176, 178, and the various wellsite equipment may be via wired and/or wireless communication means. However, for clarity and ease of understanding, such communication means are not depicted, and a person having ordinary skill in the art will appreciate that such communication means are within the scope of the present disclosure.

During well construction operations, the control device 174 may compile and store (collectively "maintain") a pipe tally (i.e., a list or inventory) containing various attributes indicative of or otherwise associated with each tubular 122 (or stand of tubulars 122) that has been received on the rig floor 114 and/or stored in the fingerboard 184 of the pipe rack 182. The pipe tally may be compiled in preparation for drilling or running drill pipe downhole, or after being retrieved from the wellbore 102. The pipe tally may comprise an identifier (e.g., an identification or serial number) of each tubular 122 in association with various attributes of that tubular 122, such as location on the fingerboard 184, weight, length, type, and historical use, among other examples. The control device 174 may automatically store (i.e., tally) the identifier of each tubular 122 as it is deployed into and withdrawn from the wellbore 102. The control device 174 may simultaneously update service records of each tubular 122 and/or calculate length of the drill string 120, and thus the wellbore 102, based on the tally. Tallying of the tubulars 122 may be facilitated by a reader (not shown) operable to read the identifier off of a tag (e.g., a radio frequency tag, a magnetic tag, a bar code, a label, etc.) (not shown) associated with each tubular 122, such as when each tubular 122 is received on the rig floor 114 and/or when being deployed into and withdrawn from the wellbore 102. The identifier may then be received by the control device 174 and stored in a memory (e.g., a database) in association with the attributes of that tubular 122, to form or update the pipe tally. The tallying of the tubulars 122 may instead be facilitated by sensors (e.g., weight and/or length sensors) (not shown) operable to determine physical attributes of each tubular 122, such as when each tubular 122 is received on the rig floor 114 and/or when being deployed into and withdrawn from the wellbore 102. The determined attributes may then be received by the control device 174 and stored in the memory in association with an identifier assigned to that tubular 122, to form or update the pipe tally. The pipe tally may thus permit the control device 174 to keep track of location of tubulars that are deployed downhole and stored on the fingerboard 184, thereby permitting the control device 174 to calculate length of the drill string 120 and the wellbore 102.

Other implementations of the well construction system 100 within the scope of the present disclosure may include more or fewer components than as described above and/or depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
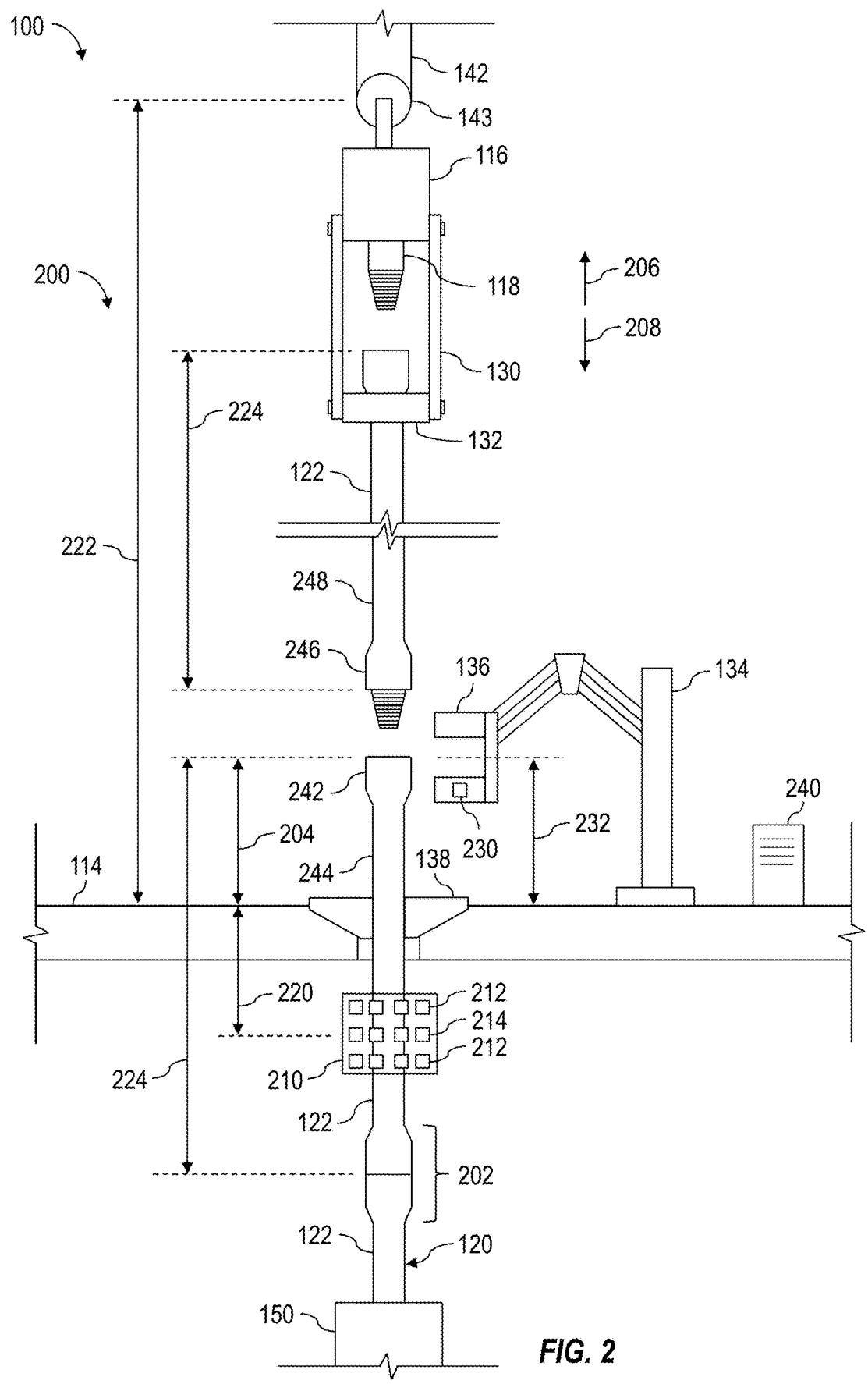
FIG. 2 is a schematic view of at least a portion of an example implementation of apparatus according to one or more aspects of the present disclosure.

FIG. 2 is a schematic view of at least a portion of an example implementation of a monitoring system 200 operable to detect connection joints 202 between adjacent tubulars 122 of a drill string 120 while the drill string 120 is being moved upward and/or downward into and/or out of the wellbore 102 during various stages of well construction operations. The monitoring system 200 may be further operable to determine a stickup height 204 of the drill string 120 extending above a rig floor 114 during various stages of the well construction operations. The monitoring system 200 may be or form a portion of the well construction system 100 shown in FIG. 1, and may be disposed or otherwise utilized in association with other portions of the well construction system 100, including where identified by the same reference numerals. Accordingly, the following description refers to FIGS. 1 and 2, collectively.

The monitoring system 200 may comprise a connection joint detector 210 operable to detect the connection joints 202 of the drill string 120 while the drill string 120 is being moved upward 206 and/or downward 208 into and/or out of the wellbore 102 by a hoisting system (e.g., the drawworks 140, the blocks 143, 145, the line 142, etc.) of the well construction system 100. The detector 210 may comprise one or more magnets 212, each operable to transmit a magnetic flux through or otherwise magnetize a portion (i.e., a segment) of the drill string 120, and one or more sensors 214, each operable to facilitate magnetic flux measurements indicative of amount of the magnetic flux that leaked out of the portion of the drill string 120 through which the magnetic flux was transmitted while the drill string 120 is being moved upward 206 and/or downward 208. The detector 210 may be disposed at or form a portion of the well construction system 100 (i.e., the drill rig) such that the drill string 120 moves 206, 208 adjacent (i.e., in close proximity to, next to, etc.) the magnets 212 and the sensors 214 while the drill string 120 is being moved upward 206 and/or downward 208. The detector 210 may be disposed below the rig floor 114 and above the well control equipment 150. The detector 210 may be connected to or otherwise supported in position by a portion of the well construction system 100, such as the rig floor 114. The detector 210 may instead be connected to, form a portion of, or otherwise be supported by the well control equipment 150.

Each of the sensors 214 may be or comprise a Hall effect sensor, a magnetic coil or a permanent magnet, or another magnetic flux (or magnetic field) sensor operable to measure amount (i.e., density) of the magnetic flux (or strength of magnetic field) adjacent the drill string 120 that that leaked out of the drill string 120 while the drill string 120 is being moved upward 206 and/or downward 208. The sensors 214 or another portion of the detector 210 may be installed or otherwise disposed at a predetermined or otherwise known location (e.g., height) within the well construction system 100. For example, the sensors 214 may be installed or otherwise disposed at a predetermined or otherwise known height 220 (or distance) with respect to (e.g., below) the rig floor 114 of the well construction system 100.

The monitoring system 200 may further comprise a position sensor 146 (shown in FIG. 1) operable to output or otherwise facilitate position measurements indicative of position of a predetermined portion of the hoisting system with respect to a predetermined portion of the well construction system 100. For example, the position measurements may be or comprise block position measurements indicative of height 222 (i.e., block position) of a traveling block 143 of the drill string hoisting system with respect to the rig floor 114. The position sensor 146 may thus be referred to as a block position sensor, and the position measurements may be referred to as block position measurements. The block position measurements may instead be facilitated by other sensors, such as a light sensor or an ultrasonic sensor.

The monitoring system 200 may further comprise a position sensor 230 operable to output or otherwise facilitate position measurements indicative of position of an iron roughneck 134 with respect to a predetermined portion of the well construction system 100. For example, the position measurements may be or comprise position measurements indicative of height (or distance) 232 of a torqueing portion 136 of the iron roughneck 134 with respect to the rig floor 114. The position sensor 230 may thus be referred to as an iron roughneck position sensor, and the position measurements may be referred to as iron roughneck position measurements.

The monitoring system 200 may further comprise a processing device 240 comprising a processor and a memory storing a computer program code. The processing device 240 may be or comprise the central control device 174 or the processing device 240 may be communicatively connected with the central control device 174. The processing device 240 may be communicatively connected with one or more of the detector 210 (e.g., the sensors 214) and the position sensors 146, 230. The processing device 240 may be operable to cause operation of the detector 210, including causing the magnets 212 to transmit the magnetic flux through the drill string 120 and receiving the magnetic flux measurements facilitated by the sensors 214 while the drill string 120 is being moved upward 206 and/or downward 208 into and/or out of the wellbore 102. The processing device 240 may be operable to detect each connection joint 202 between adjacent tubulars 122 of the drill string 120 based on the received magnetic flux measurements. For example, the processing device 240 may be operable to detect a connection joint 202 when the magnetic flux measurements are indicative of a change (e.g., decrease) in the amount (i.e., level) of magnetic flux detected by the sensors 214 with respect to a baseline amount of magnetic flux. Thus, the processing device 240 may be operable to determine a location of the connection joint 202 by determining a location along the drill string 120 where the magnetic flux measurements are indicative of a change in the amount of magnetic flux with respect to the baseline amount. Because the location (i.e., height 220) of the sensors 214 is known, the processing device 240 may determine that the moving connection joint 202 is located at the height 220 below the rig floor 114 when the magnetic flux measurements are indicative of a change in the amount of magnetic flux detected by the sensors 214 with respect to the baseline amount of magnetic flux.

The processing device 240 may be further operable to receive and record the predetermined height 220 of the sensors 214 of the detector 210, receive the block position measurements indicative of the height 222 of the travelling block 143 while the hoisting system moves 206, 208 the drill string 120, and determine the stickup height 204 of the drill string 120 based on the predetermined height 220 and the height 222 of the travelling block 143. The stickup height 204 may be or comprise height above the rig floor 114 of an upper end 242 (box end) of a tubular 244 of the drill string 120 that is gripped by the slips 138. After the stickup height 204 is determined, the processing device 240 or another equipment controller may control the iron roughneck 134 to cause the iron roughneck 134 to lift the torqueing portion 136 to a height 232 that is substantially equal to the determined stickup height 204, such as may permit the torqueing portion 136 to engage the upper end 242 of the tubular 244 and a lower end 246 (pin end) of an upper tubular 248 to make up (or form) or to break out (or take apart) a connection joint 202 therebetween.

The stickup height 204 may be determined during drilling operations while the drill string 120 is being moved downward 208 to form the wellbore 102 and during pipe tripping operations while the drill string 120 is being moved downward 208 into the wellbore 102 (i.e., during "run in hole" operations). During such operations, the processing device 240 may maintain a pipe tally, thereby permitting the processing device 240 to keep track of location and physical attributes (e.g., measured length 224) of each tubular 122. The processing device 240 may also receive the magnetic flux measurements and detect each connection joint 202 based on the magnetic flux measurements when each connection joint 202 passes the sensors 214 of the detector 210 while the drill string 120 is moved downward 208. When the processing device 240 detects a connection joint 202, the processing device 240 may start tracking (e.g., recording, counting, etc.) distance (i.e., height) by which the drill string 120 moves downward 208. For example, when the processing device 240 detects a connection joint 202 passing the sensors 214, the processing device 240 may reset or initiate a distance counter that starts tracking the block position measurements facilitated by the block position sensor 146 to measure or otherwise determine changes in the height 222 (i.e., distance of movement) of the travelling block 143. When the drill string 120 is moved downward 208 such that the upper end 242 of the tubular 244 of the drill string 120 sticks out above the rig floor 114, the processing device 240 or another equipment controller may cause the drawworks 140 to stop lowering the drill string 120. The processing device 240 may then determine (i.e., calculate) the change in height 222 of the travelling block 143 based on the tracked block position measurements. The processing device 240 may also determine the position (i.e., height) of the connection joint 202 (e.g., below the rig floor 114 and/or the sensors 214) based on the change in height 222 of the travelling block 143. The processing device 240 may then determine the stickup height 204 of the tubular 244 by subtracting the predetermined height 220 of the sensors 214 and the determined change in height 222 of the travelling block 143 from the measured length 224 of the tubular 244. The length 224 of the tubular 244 (maintained as part of the pipe tally) may be measured before or during the drilling or tripping operations or otherwise be known. Thus, the stickup height 204 may be determined by utilizing Equation (1) set forth below.

$$H_{SU} = L - H_{MFS} - \Delta H_{TB} \quad (1)$$

where $H_{SU}$ is the stickup height 204, L is the measured length 224 of the tubular 244, $H_{MFS}$ is the height 220 of the magnetic flux sensors 214 below the rig floor 220, and $\Delta H_{TB}$ is the change in the height 222 of the travelling block 143. After the stickup height 204 is determined, the processing device 240 or another equipment controller may control the iron roughneck 134 to cause the iron roughneck 134 to lift the torqueing portion 136 to a height 232 that is substantially equal to the determined stickup height 204, such as may permit the torqueing portion 136 to engage the upper end 242 of the tubular 244 and a lower end 246 (pin end) of a new tubular 248 to make up a connection joint 202 therebetween to therefore add the new tubular 248 to the drill string 120.

The stickup height 204 may be determined during pipe tripping operations while the drill string 120 is being moved upward 206 out of the wellbore 102 (i.e., during "pull out of hole" operations) and disassembled. During such operations, the processing device 240 may receive the magnetic flux measurements and detect each connection joint 202 based on the magnetic flux measurements when each connection joint 202 passes the sensors 214 of the detector 210 while moving upward 206. When the processing device 240 detects a connection joint 202, the processing device 240 may start tracking distance by which the drill string 120 moves upward 206. For example, when the processing device 240 detects a connection joint 202, the processing device 240 may reset or initiate a distance counter that starts tracking the block position measurements facilitated by the block position sensor 146 to measure or otherwise determine changes in height 222 of the travelling block 143. When the drill string 120 is moved upward 206 such that the tubular 248 is above the rig floor 114, the processing device 240 or another equipment controller may cause the drawworks 140 to stop lifting the drill string 120. The processing device 240 may then determine the change in height 222 of the travelling block 143 based on the tracked block position measurements. The processing device 240 may also determine the position of the connection joint 202 (e.g., above the rig floor 114 and/or the sensors 214) based on the change in height 222 of the travelling block 143. The processing device 240 may then determine the stickup height 204 by subtracting the predetermined height 220 of the sensors 214 from the determined change in height 222 of the travelling block 143. Thus, the stickup height 204 may be determined by utilizing Equation (2) set forth below.

$$H_{SU} = \Delta H_{TB} - H_{MFS} \quad (2)$$

where $H_{SU}$ is the stickup height 204, $\Delta H_{TB}$ is the change in height 222 of the travelling block 143, and $H_{MFS}$ is the height 220 of the magnetic flux sensors 214 below the rig floor. After the stickup height 204 is determined, the processing device 240 or another equipment controller may control the iron roughneck 134 to cause the iron roughneck 134 to lift the torqueing portion 136 to a height 232 that is substantially equal to the determined stickup height 204, such as may permit the torqueing portion 136 to engage the upper end 242 of the tubular 244 and the lower end 246 of the tubular 248 to break out the connection joint 202 therebetween.

Figure 3:
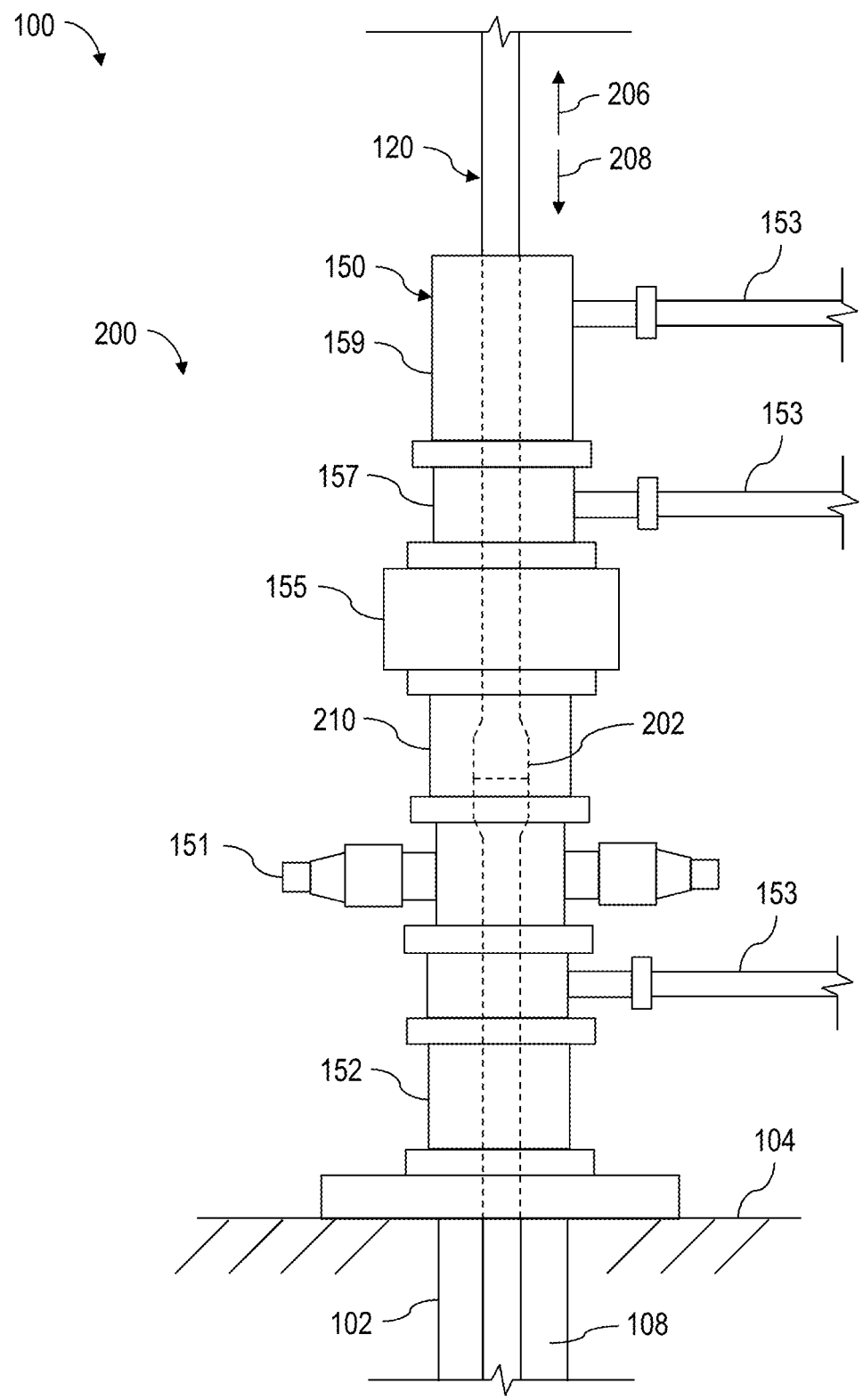
FIG. 3 is a schematic view of at least a portion of an example implementation of apparatus according to one or more aspects of the present disclosure.

As described above, the detector 210 may be connected to (e.g., be installed in association with), form a portion of, or otherwise be supported in position by the well control equipment 150 mounted on top of a wellhead 152, such as may permit the detector 210 to detect a connection joint 202 while the drill string 120 is being moved into and/or out of the wellbore 102 through the well control equipment 150. FIG. 3 is a schematic view of an example implementation of the detector 210 shown in FIG. 2 supported by the well control equipment 150. The detector 210 may be operable to detect a connection joint 202 of a drill string 120 while the drill string 120 is being moved upward 206 and/or downward 208 into and/or out of a wellbore 102. The detector 210 may be or form a portion of the monitoring system 200 shown in FIG. 2. The following description refers to FIGS. 1-3, collectively.

The detector 210 may be connected above, below, or between blowout preventers (BOPS) of a BOP stack 151 for maintaining well pressure control. The detector 210 may instead be integrated within one of the BOPs of the BOP stack 151, such as by including the magnets 212 and the sensor 214 within or along an inner wall of one of the BOPs. The detector 210 may instead be connected above or below an annular preventer 155. The detector 210 may instead be integrated within the annular preventer 155, such as by including the magnets 212 and the sensor 214 within or along an inner wall of the annular preventer 155. A detector 210 may instead be connected above or below a rotating control device (RCD) 157 for evacuating drilling fluid from the annular space 108 via a corresponding fluid conduit 153 while controlling wellbore pressure during managed pressure drilling (MPD) operations. The detector 210 may instead be integrated within the RCD 157. A detector 210 may also or instead be connected above, below, or integrated within a bell nipple 159 for evacuating drilling fluid from the annular space 108 via a corresponding fluid conduit 153 during normal drilling operations.

The connection joints 202 may be detected by the detector 210 when the drill string 120 is passed through the well control equipment 150 during drilling operations or while the drill string 120 is being run into or out of the wellbore 102. During such operations, the processing device 240 may receive the magnetic flux measurements and detect each connection joint 202 based on the magnetic flux measurements when each connection joint 202 passes the sensors 214 of the detector 210 while the drill string 120 is moved upward 206 or downward 208. The processing device 240 may then determine the position of the detected connection joint 202 based on the change in height 222 of the travelling block 143, as described above. The processing device 240 may thus determine if the detected connection joint 202 is above, below, or at the same level as the detector 210, and thus, above, below, or within a device (e.g., the RCD 157, the annular preventer 155, or the BOP stack 151) of the well control equipment 150.

The monitoring system 200 may also control or otherwise cause predetermined operation of the well control equipment 150 and/or the hoisting system to control position of the drill string 120 when a connection joint 202 is determined to be located within the well control equipment 150. The monitoring system 200 may control the RCD 157 when a connection joint 202 is determined to be located within the RCD 157. For example, if the processing device 240 determines that a connection joint 202 is located within the RCD 157, the processing device 240 may cause the RCD 157 to operate accordingly, such as to optimize operation of the RCD 157 or compensate for the connection joint 202 being within the RCD 157. The monitoring system 200 may also be or operate as an interlock system configured to prevent one or more of the well control devices 151, 155 from closing or otherwise operating while a connection joint 202 is determined to be located within that well control device 151, 155. For example, if the processing device 240 determines that a connection joint 202 is located within the BOP stack 151 or the annular preventer 155, the processing device 240 may prevent that well control device 151, 155 from closing or otherwise operating until the connection joint 202 moves out or is otherwise outside of that well control device 151, 155. However, if the processing device 240 determines that a connection joint 202 is located within a well control device 151, 155, the processing device 240 may instead cause the hoisting system (e.g., the drawworks 140) to lift or lower the drill string 120 until the connection joint 202 moves out or is otherwise outside of that well control device 151, 155 (or out of the well control equipment 150) before that well control device 151, 155 is permitted to close or otherwise operate.

Figure 4:
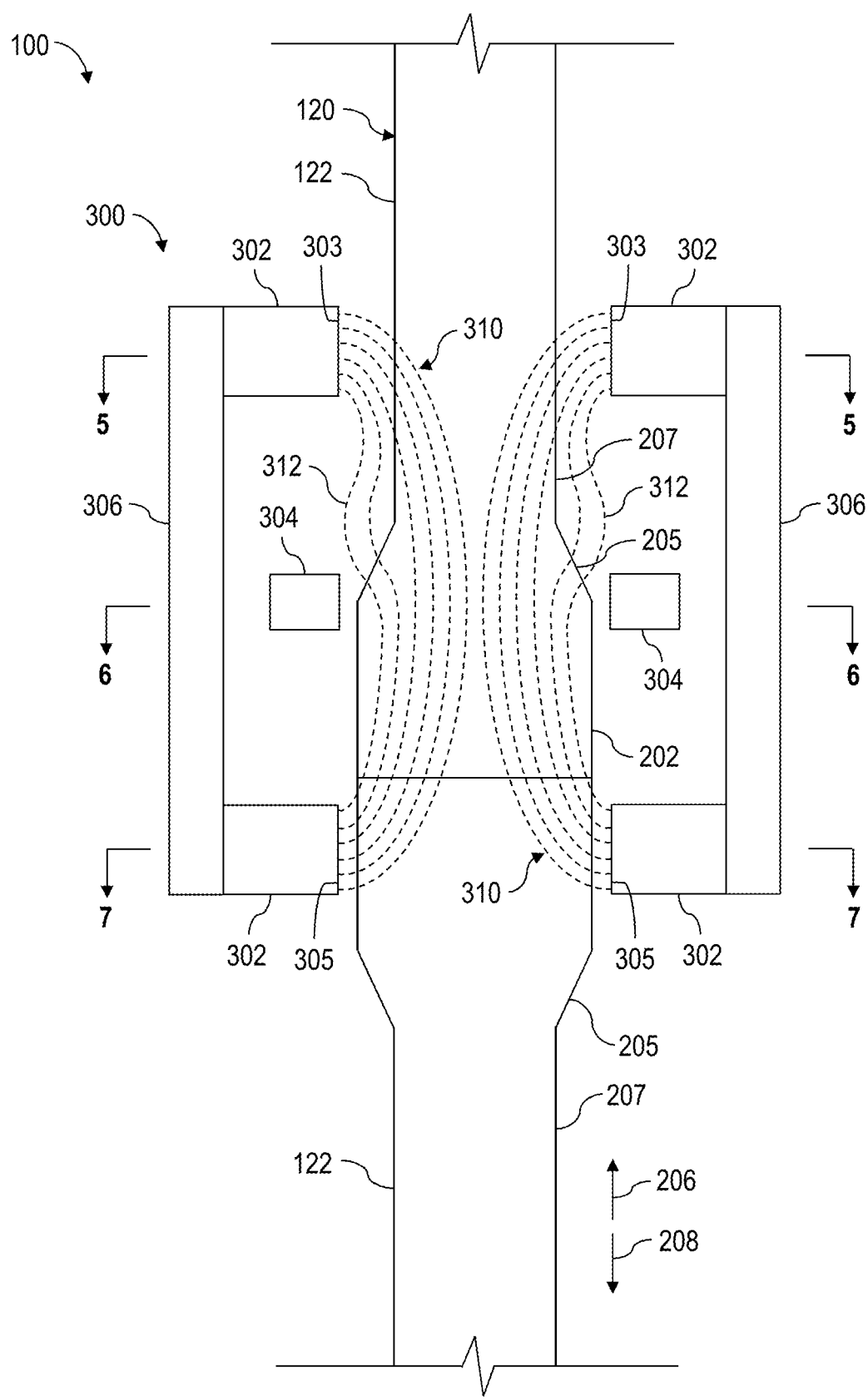
FIG. 4 is a schematic view of at least a portion of an example implementation of apparatus according to one or more aspects of the present disclosure.

FIG. 4 is a schematic view of an example implementation of a detector 300 operable to detect connection joints 202 of a drill string 120 while the drill string 120 is being moved upward 206 and/or downward 208 by a hoisting system (e.g., a drawworks 140, blocks 143, 145, a conveyance line 142, etc.). The detector 300 may be or form a portion of or otherwise utilized in association with the well construction system 100 shown in FIG. 1 and/or the monitoring system 200 shown in FIGS. 2 and 3, including where identified by the same reference numerals. The detector 300 may comprise one or more features and/or modes of operation of the detector 210 described above and shown in FIGS. 2 and 3, respectively. Accordingly, the following description refers to FIGS. 1-4, collectively.

The detector 300 may comprise one or more magnets 302, each operable to transmit a magnetic flux 310 through a portion (i.e., a segment) of the drill string 120, and one or more sensors 304, each operable to facilitate magnetic flux measurements indicative of amount of magnetic flux 310 (or strength of a magnetic field) that leaked out 312 of the portion of the drill string 120 through which the magnetic flux 310 was transmitted while the drill string 120 is being moved upward 206 and/or downward 208 into and/or out of the wellbore 102. The detector 300 may be disposed at or form a portion of the well construction system 100 (i.e., the drill rig) such that the drill string 120 moves adjacent the magnets 302 and the sensors 304 while the drill string 120 is being moved upward 206 and/or downward 208.

The detector 300 may comprise one or more sensors 304 and one or more components operable to generate a magnetic field, such as electromagnetic coils or permanent magnets (collectively referred to as magnets 302). The magnets 302 may be collectively operable to magnetize a portion of the drill string 120, such as by transmitting magnetic flux 310 through a portion of the drill string 120. Each magnet 302 may have a first magnetic pole 303 (e.g., the north magnetic pole) and a second magnetic pole 305

(e.g., the south magnetic pole) on opposing sides (i.e., above and below) of a corresponding sensor 304 such that the sensor 304 is located between the first magnetic pole 303 and the second magnetic pole 305 of a magnet 302. The first and second magnetic poles 303, 305 of each magnet 302 may face the drill string 120, such that during the well construction operations (e.g., drilling operations, tripping operations, etc.), the magnetic flux 310 flows through a portion of the drill string 120 between the first magnetic pole 303 and the second magnetic pole 305 of the magnet 302 while the drill string 120 is moved upward 206 or downward 208. However, the detector 300 may instead comprise one or more sensors 304 and two or more magnets 302, each located on an opposing side (i.e., above and below) of a sensor 304 such that the sensor 304 is located between the first magnet 302 and the second magnet 302. The first (e.g., upper) magnet 302 may have a first magnetic pole 303 (e.g., the north magnetic pole) facing the drill string 120 and the second (e.g., lower) magnet 302 may have a second opposing magnetic pole 305 (e.g., the south magnetic pole) facing the drill string 120, such that during the well construction operations the magnetic flux 310 flows through a portion of the drill string 120 between the first magnetic pole 303 of the first magnet 302 and the second magnetic pole 305 of the second magnet 302 while the drill string 120 is moved upward 206 or downward 208. The first and second magnets 302 may be connected by a magnetic bridge 306 (e.g., an iron or another magnetic back plate) configured to decrease resistance to flow of magnetic flux between the remaining magnetic poles (i.e., opposite from magnetic poles 303, 305) of the first and second magnets 302. Alternatively, the components operable to generate the magnetic flux 310 may be or comprise one or more permanent magnetic bars positioned lengthwise (i.e., parallel to) along the tubulars 122 of the drill string 120 and operable to perform the collective operations of the magnets 302 and the magnetic bridge 306.

Figure 5:
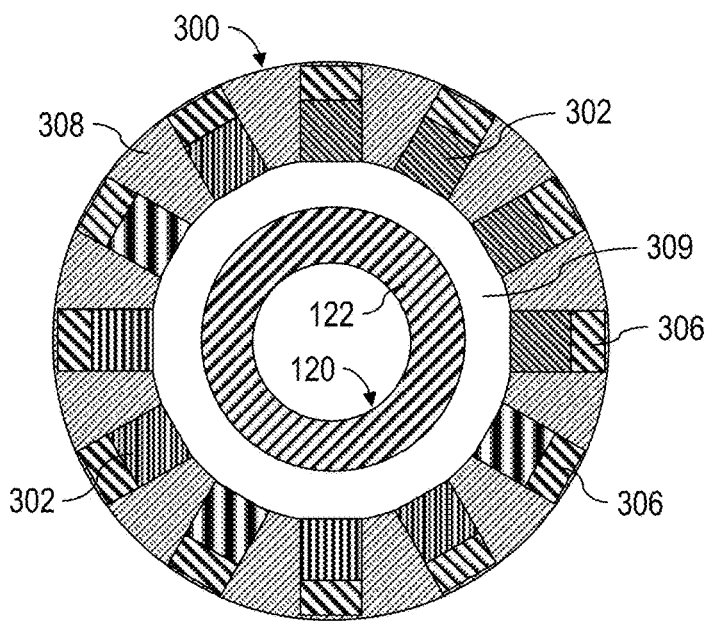
FIGS. 5-7 are sectional views of an example implementation of the apparatus shown in FIG. 4.
Figure 6:
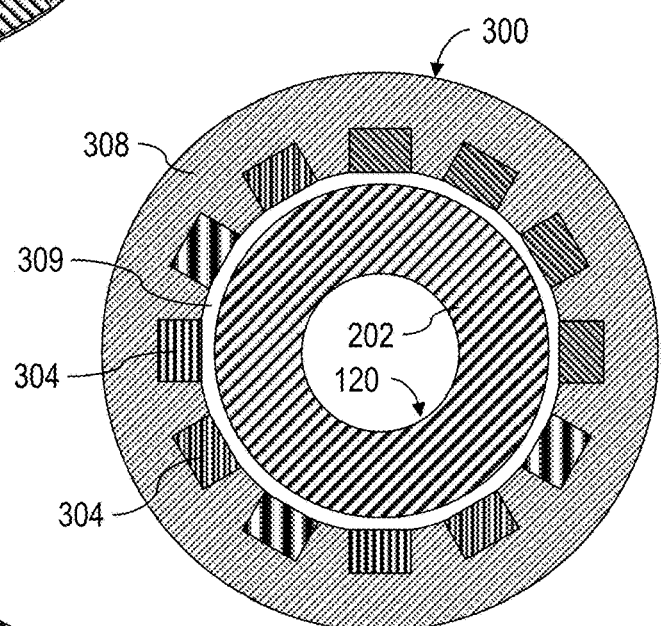
Figure 7:
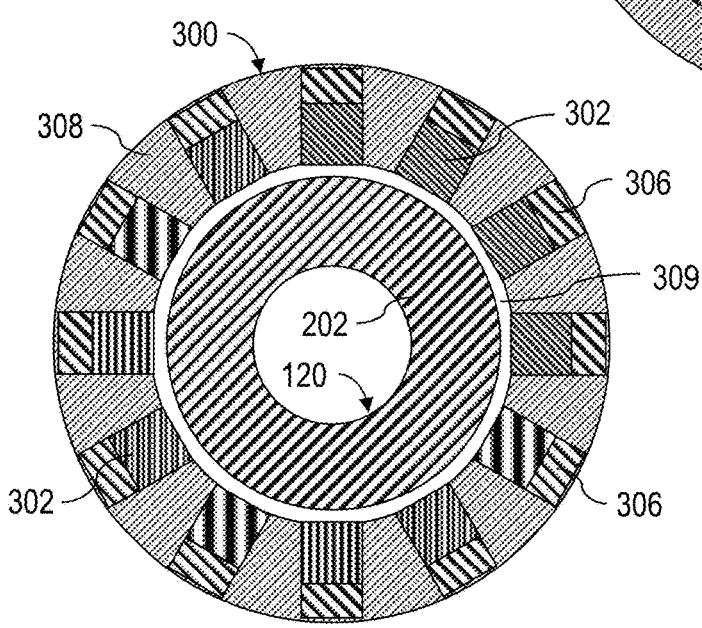

FIGS. 5-7 are sectional views of the detector 300 shown in FIG. 4. The detector 300 may comprise a plurality of magnets 302 distributed in a generally circular pattern defining a portion of a generally cylindrical space 309 configured to accommodate the drill string 120 while the drill string 120 is being moved upward 206 and/or downward 208 into and/or out of the wellbore 102. Similarly, the detector 300 may comprise a plurality of sensors 304 distributed in a generally circular pattern defining a portion of the generally cylindrical space 309. The magnets 302 and the sensors 304 may be maintained in position by a housing 308 comprising a non-magnetic material. The detector 300 may be disposed at the well construction system 100 such that the drill string 120 can move through the generally cylindrical space 309 between the magnets 302 and the sensors 304 while the drill string 120 is being moved upward 206 and/or downward 208 into and/or out of the wellbore 102. Although FIGS. 5-7 show the detector 300 comprising twelve magnets 302 and twelve sensors 304 distributed in a generally circular pattern, it is to be understood that a detector within the scope of the present disclosure may instead comprise a different quantity (e.g., four, five, six, seven, eight, nine, ten, eleven, thirteen, or more) of magnets 302 and sensors 304 arranged in a generally circular pattern.

The detector 300 may be communicatively connected with the processing device 240, such as may permit the processing device 240 to receive the magnetic flux measurements facilitated by the sensors 304 and detect each connection joint 202 between adjacent tubulars 122 of the drill string 120 while the drill string 120 is being moved upward 206 and/or downward 208 into and/or out of the wellbore 102 based on the received magnetic flux measurements. A portion of the drill string having more material (i.e., a larger wall thickness), such as along a connection joint 202, may conduct (i.e., transmit) more magnetic flux 310 than a portion of the drill string 120 having less material (i.e., a smaller wall thickness), such as along a base portion 207 (i.e., a shank) of each tubular 122, which may cause the magnetic flux 310 to leak out 312 of the drill string 120. Thus, a change in the amount of magnetic flux 310 detected along (i.e., adjacent) the drill string 120 while the drill string 120 is moved upward 206 or downward 208 may be indicative of a change in wall thickness of the drill string 120, thereby permitting the processing device 240 to detect a connection joint 202 based on the magnetic flux measurements when the connection joint 202 passes the sensors 304 of the detector 300. Because connection joints 202 comprise a larger wall thickness than the base portions 207 of the drill string 120, the connection joints 202 may cause or otherwise be associated with an increased ability to conduct magnetic flux 310, and thus a decrease in the amount of magnetic flux 310 that leaked out of the drill string 120 that can be detected by the sensors 304. Thus, when a connection joint 202 passes adjacent the magnets 302, magnetic flux 310 may flow between the opposing poles 303, 305 of the magnets 302 through the connection joint 202, causing a reduction in the amount of magnetic flux 310 detected by the sensors 304. However, when the connection joint 202 moves past the magnets 302, some of the magnetic flux 310 may leak 312 out of the connection joint 202 at a transition shoulder 205 between the connection joint 202 and the base portion 207 of the drill string 120 where the amount of metal (and wall thickness) decreases, causing an increase in the amount of magnetic flux 310 detected by the sensors 304. Accordingly, the processing device 240 may be operable to detect connection joints 202 by detecting changes in the amount of magnetic flux 310 detected by the sensors 304 caused by or otherwise associated with the connection joints 202 while the drill string 120 is moved 206, 208 adjacent the detector 300.

Although FIGS. 2 and 4-7 show the detectors 210, 300 each comprising a plurality of magnets 212, 302 and a plurality of sensors 214, 304 distributed in a generally circular pattern, it is to be understood that a detector within the scope of the present disclosure may instead comprise a single magnet (e.g., one of the magnets 212, 302) operable to transmit magnetic flux through a portion of the drill string 120, and a single sensor (e.g., one of the sensors 214, 304) operable to facilitate magnetic flux measurements along the portion of the drill string 120. A detector within the scope of the present disclosure may instead comprise two magnets, each on an opposing side of the drill string 120 and operable to transmit magnetic flux through a portion of the drill string 120, and two sensors, each on an opposing side of the drill string 120 and operable to facilitate magnetic flux measurements along the portion of the drill string 120. A detector within the scope of the present disclosure may instead comprise three magnets distributed 120 degrees apart around the drill string 120 and each operable to transmit magnetic flux through a portion of the drill string 120, and three sensors distributed 120 degrees apart around the drill string 120 and each operable to facilitate magnetic flux measurements along the portion of the drill string 120. A detector within the scope of the present disclosure may instead comprise four magnets distributed 90 degrees apart around the drill string 120 and each operable to transmit magnetic flux through a portion of the drill string 120, and four sensors distributed 90 degrees apart around the drill string 120 and each operable to facilitate magnetic flux measurements along the portion of the drill string 120.

Figure 8:
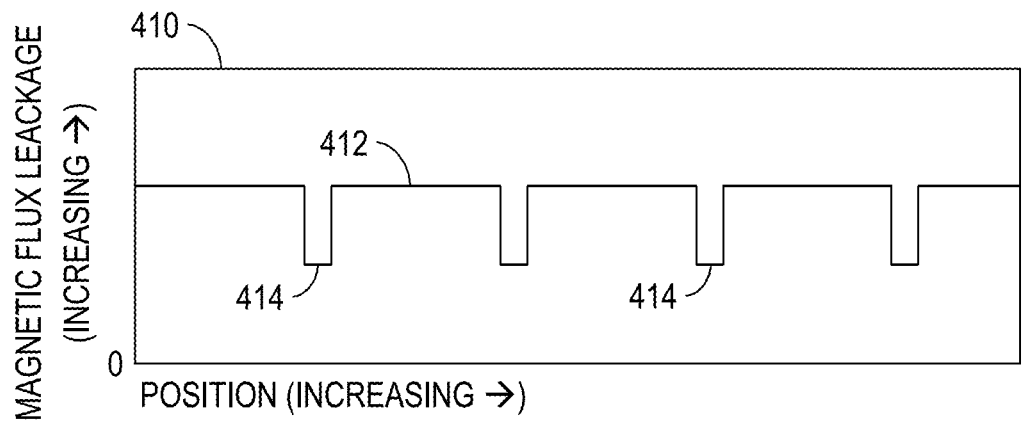
FIGS. 8 and 9 are graphs related to one or more aspects of the present disclosure.
Figure 9:
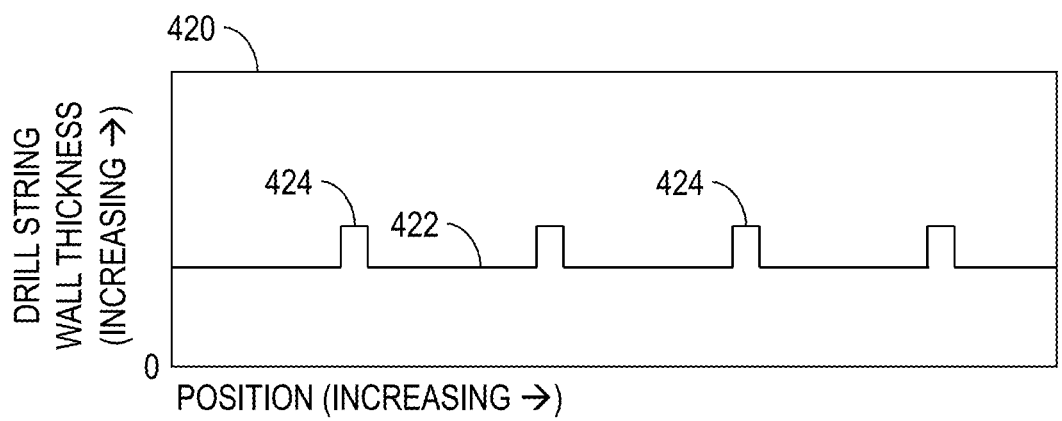

FIGS. 8 and 9 shown graphs 410, 420, respectively, related to one or more aspects of the present disclosure. Graph 410 shows example magnetic flux leakage measurements 412, plotted along the vertical axis, with respect to axial position of the drill string, plotted along the horizontal axis. Graph 420 shows example drill string wall thickness measurements 422, plotted along the vertical axis, with respect to axial position along the drill string, plotted along the horizontal axis. The measurements 412, 422 may be taken while the drill string 120 is moved upward 206 or downward 208 along the detector 210, 300 shown in FIGS. 2-7. Thus, the measurements 412, 422 in each graph 410, 420, respectively, are shown with respect to the same axial position scale plotted along the horizontal axis, thereby showing associated (i.e., corresponding) changes to magnetic flux leakage measurements 412 and drill string wall thickness measurements 422 while the drill string 120 is moved upward 206 or downward 208. The following description refers to FIGS. 1-9, collectively.

As described above, a decrease 414 in the amount of magnetic flux leakage measurements 412 along the drill string 120 while the drill string 120 is moved upward 206 or downward 208 are associated with and thus indicative of an increase 424 in the drill string wall thickness measurements 422. Because connection joints 202 have a larger wall thickness, a sudden decrease 414 in magnetic flux leakage measurements 412 and/or a sudden increase 424 in the drill string wall thickness measurements 422 facilitated by the sensors 304 of the detector 300 while the drill string 120 is moved upward 206 or downward 208 may be associated with, and thus indicative of, a connection joint 202 of the drill string 120. Accordingly, the processing device 240 may be operable to detect a location of a connection joint 202 by determining a location along the drill string 120 at which the magnetic flux measurements 412 are indicative of a decrease 414 of the amount of magnetic flux that leaked from the drill string 120, and thus indicative of an increase 424 in wall thickness of the drill string 120.

Figure 10:
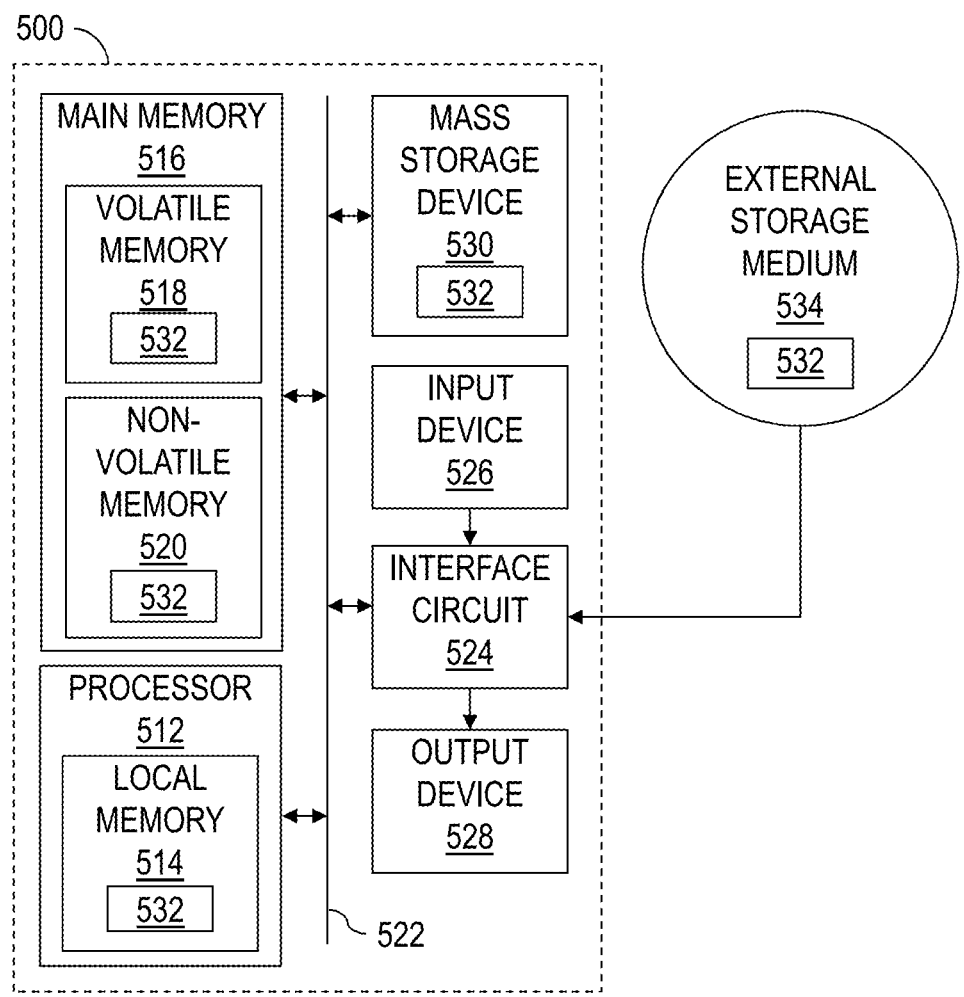
FIG. 10 is a schematic view of at least a portion of an example implementation of apparatus according to one or more aspects of the present disclosure.

FIG. 10 is a schematic view of at least a portion of an example implementation of a processing device 500 (or system) according to one or more aspects of the present disclosure. The processing device 500 may be or form at least a portion of one or more control devices and/or other electronic devices shown in one or more of the FIGS. 1-9. Accordingly, the following description refers to FIGS. 1-9, collectively.

The processing device 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. One or more instances of the processing device 500 may be or form at least a portion of the monitoring system 200 or another monitoring and/or control system of the well construction system 100. For example, one or more instances of the processing device 500 may be or form at least a portion of the control workstation 172, the central controller 174, and/or the control device 240. Although it is possible that the entirety of the processing device 500 is implemented within one device, it is also contemplated that one or more components or functions of the processing device 500 may be implemented across multiple devices, some or an entirety of which may be at the wellsite and/or remote from the wellsite.

The processing device 500 may comprise a processor 512, such as a general-purpose programmable processor. The processor 512 may comprise a local memory 514 and may execute machine-readable and executable program code instructions 532 (i.e., computer program code) present in the local memory 514 and/or another memory device. The processor 512 may execute, among other things, the program code instructions 532 and/or other instructions and/or programs to implement the example methods and/or operations described herein. For example, the program code instructions 532, when executed by the processor 512 of the processing device 500, may cause one or more portions or pieces of well construction equipment within the scope of the present disclosure to perform the example methods and/or operations described herein.

The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 512 include one or more INTEL microprocessors, microcontrollers from the ARM and/or PICO families of microcontrollers, embedded soft/hard processors in one or more FPGAs.

The processor 512 may be in communication with a main memory 516, such as may include a volatile memory 518 and a non-volatile memory 520, perhaps via a bus 522 and/or other communication means. The volatile memory 518 may be, comprise, or be implemented by random-access memory (RAM), static RAM (SRAM), dynamic RAM (DRAM), synchronous DRAM (SDRAM), RAMBUS DRAM (RDRAM), and/or other types of RAM devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing device 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third-generation input/output (3GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 500 may be in communication with various sensors, video cameras, actuators, processing devices, control devices, and other devices of the well construction system via the interface circuit 524. The interface circuit 524 can facilitate communications between the processing device 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 526 may also be connected to the interface circuit 524. The input devices 526 may permit rig personnel to enter the program code instructions 532, which may be or comprise control data, operational parameters, operational setpoints, a well construction drill plan, and/or database of operational sequences. The program code instructions 532 may further comprise modeling or predictive routines, equations, algorithms, processes, applications, and/or other programs operable to perform example methods and/or operations described herein. The input devices 526 may be, comprise, or be implemented by a keyboard, a mouse, a joystick, a touchscreen, a track-pad, a trackball, an isopoint, and/or a voice recognition system, among other examples. One or more output devices 528 may also be connected to the interface circuit 524. The output devices 528 may permit for visualization or other sensory perception of various data, such as sensor data, status data, and/or other example data. The output devices 528 may be, comprise, or be implemented by video output devices (e.g., an LCD, an LED display, a CRT display, a touchscreen, etc.), printers, and/or speakers, among other examples. The one or more input devices 526 and the one or more output devices 528 connected to the interface circuit 524 may, at least in part, facilitate the HMIs described herein.

The processing device 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a compact disk (CD) drive, and/or digital versatile disk (DVD) drive, among other examples. The processing device 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 may be stored in the mass storage device 530, the main memory 516, the local memory 514, and/or the removable storage medium 534. Thus, the processing device 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 532 may include program instructions or computer program code that, when executed by the processor 512, may perform and/or cause performance of example methods, processes, and/or operations described herein.

The present disclosure is further directed to example methods (e.g., operations, processes, actions, etc.) for monitoring and controlling well construction equipment 110, 120 of a well construction system 100. In the following description, one or more descriptors and/or other references to such example methods may not be applicable to the entirety of one or more of the methods. That is, such references may instead be applicable to just one or more aspects of one or more of the methods. Thus, references to "the example methods" are to be understood as being applicable to the entirety of one or more of the methods and/or one or more aspects of one or more of the methods.

The example methods may be performed utilizing or otherwise in conjunction with one or more implementations of one or more instances of one or more components of the apparatus shown in one or more of FIGS. 1-10 and/or otherwise within the scope of the present disclosure. For example, the example methods may be at least partially performed (and/or caused to be performed) by a processing device, such as the processing device 500 executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be at least partially performed (or be caused to be performed) by a human user (e.g., rig personnel) utilizing one or more implementations of one or more instances of one or more components of the apparatus shown in one or more of FIGS. 1-10 and/or otherwise within the scope of the present disclosure. Accordingly, the following description refers to apparatus shown in one or more of FIGS. 1-10 and example methods that may be performed by such apparatus. However, the example methods may also be performed in conjunction with implementations of apparatus other than those depicted in FIGS. 1-10 that are also within the scope of the present disclosure.

In view of the entirety of the present disclosure, including the figures and the claims, a person having ordinary skill in the art will recognize that the present disclosure introduces an apparatus comprising: a magnet operable to magnetize a portion of a drill string extending out of a wellbore, wherein the wellbore extends into a subterranean formation below a drill rig; a sensor operable to facilitate magnetic flux measurements indicative of an amount of magnetic flux that leaked from the drill string along the magnetized portion of the drill string; and a processing device comprising a processor and a memory storing a computer program code, wherein the processing device is operable to receive the magnetic flux measurements and detect a connection joint between adjacent drill pipes of the drill string based on the magnetic flux measurements.

The magnet and the sensor may be disposed at the drill rig such that the drill string moves adjacent the magnet and the sensor while the drill string is moved into and out of the wellbore.

The magnet and the sensor may be disposed below a rig floor of the drill rig such that the drill string moves adjacent the magnet and the sensor while the drill string is moved into and out of the wellbore.

The magnet and the sensor may be connected with and/or supported by an RCD such that the drill string moves adjacent the magnet and the sensor while the drill string is moved through the RCD.

The magnet and the sensor may be connected with and/or supported by a BOP such that the drill string moves adjacent the magnet and the sensor while the drill string is moved through the BOP.

The magnet may be a first magnet of a plurality of magnets distributed in a generally circular pattern, the sensor may be a first sensor of a plurality of sensors distributed in a generally circular pattern, and the magnets and the sensors may be disposed at the drill rig such that the drill string moves between the magnets and the sensors while the drill string is moved into and out of the wellbore.

The processing device may be operable to detect the connection joint when the magnetic flux measurements are indicative of an increase in wall thickness of the drill string.

The processing device may be operable to detect a location of the connection joint by determining a location along the drill string at which the magnetic flux measurements are indicative of a decrease of the amount of magnetic flux that leaked from the drill string.

The sensor may be a magnetic flux sensor disposed at a predetermined height, the apparatus may further comprise a block position sensor operable to facilitate block position measurements indicative of a height of a travelling block of a hoisting system, and the processing device may be further operable to: receive the block position measurements while the hoisting system moves the drill string; and determine a stickup height of the drill string based on the predetermined height of the magnetic flux sensor and the block position measurements. The processing device may be further operable to output the determined stickup height to cause the iron roughneck to move to the stickup height to break out the detected connection joint or make up another connection joint. After the processing device detects the connection joint, and while the drill string is being moved out of the wellbore, the processing device may be operable to: determine a change in the height of the travelling block based on the block position measurements; and determine the stickup height of the drill string by subtracting the predetermined height of the magnetic flux sensor from the change in the height of the travelling block. The processing device may be operable to, after the processing device detects the connection joint and while the drill string is being moved into the wellbore: determine a change in the height of the travelling block based on the block position measurements; and determine the stickup height of the drill string by subtracting the predetermined height of the magnetic flux sensor and the change in the height of the travelling block from a measured length of an uppermost drill pipe of the drill string. The predetermined height of the magnetic flux sensor may be or comprise a height of the magnetic flux sensor with respect to a rig floor of the drill rig, the block position measurements may be indicative of the height of the travelling block with respect to the rig floor, and the stickup height may be or comprise a height of an upper end of the drill string with respect to the rig floor.

The sensor may be a magnetic flux sensor disposed at a predetermined height, the apparatus may further comprise a block position sensor operable to facilitate block position measurements indicative of a height of a travelling block of a hoisting system, and the processing device may be further operable to: receive the block position measurements while the hoisting system moves the drill string; determine a position of the connection joint based on the predetermined height of the magnetic flux sensor and the block position measurements; and before a BOP is operated, cause the hoisting system to move the drill string such that the detected connection joint is outside of the BOP.

The present disclosure also introduces a method comprising, while a drill string is moved into and out of a wellbore: transmitting magnetic flux through a portion of the drill string; measuring leakage of the magnetic flux along the portion of the drill string; and detecting a connection joint between adjacent drill pipes of the drill string based on a change in the measured leakage of the magnetic flux.

Transmitting the magnetic flux may be performed by a magnet, measuring the magnetic flux leakage may be performed by a sensor; and the drill string may be moved adjacent the magnet and the sensor. The magnet may be a first magnet of a plurality of magnets distributed in a generally circular pattern, the sensor may be a first sensor of a plurality of sensors distributed in a generally circular pattern, and the method may further comprise moving the drill string between the magnets and the sensors while the drill string is moved into and out of the wellbore. The sensor may be disposed at a predetermined height and the method may further comprise: receiving block position measurements indicative of a height of a travelling block of a hoisting system; determining a stickup height of the drill string based on the predetermined height of the sensor and the block position measurements; and causing the iron roughneck to move to the determined stickup height to break out the detected connection joint or make up another connection joint. The sensor may be disposed at a predetermined height and the method may further comprise: receiving block position measurements indicative of a height of a travelling block of a hoisting system; determining a position of the connection joint based on the predetermined height of the magnetic flux sensor and the block position measurements; and before a BOP is operated, causing the drill string to move such that the detected connection joint is outside of the BOP.

The present disclosure also introduces an apparatus comprising: (A) a plurality of magnets disposed with respect to a rig floor of a drill rig such that the drill string can move into and out of a wellbore between the magnets, wherein the magnets are operable to transmit a magnetic flux through a portion of the drill string while the drill string is moved into and out of the wellbore; (B) a magnetic flux sensor disposed such that the drill string can move into and out of the wellbore adjacent the magnetic flux sensor, wherein the magnetic flux sensor is operable to facilitate magnetic flux measurements indicative of an amount of magnetic flux that leaked from the portion of the drill string through which the magnetic flux is transmitted while the drill string is moved into and out of the wellbore; (C) a block position sensor operable to facilitate block position measurements; and (D) a processing device comprising a processor and a memory storing a computer program code, wherein the processing device is operable to: (1) receive the magnetic flux measurements; (2) detect a connection joint between adjacent drill pipes of the drill string based on the magnetic flux measurements; (3) receive the block position measurements; and (4) determine a stickup height of the drill string based on the predetermined height of the magnetic flux sensor and the block position measurements.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
 a magnet operable to magnetize a portion of a drill string extending out of a wellbore, wherein the wellbore extends into a subterranean formation below a drill rig;
 a sensor operable to facilitate magnetic flux measurements indicative of an amount of magnetic flux that leaked from the drill string along the magnetized portion of the drill string, wherein the sensor is disposed at a known height relative to a structure of the drill rig;
 a block position sensor operable to facilitate block position measurements indicative of a height of a travelling block of a hoisting system; and
 a processing device comprising a processor and a memory storing a computer program code, wherein the processing device is operable to:
  receive the magnetic flux measurements;
  receive the block position measurements;
  detect a connection joint between adjacent drill pipes of the drill string based on the magnetic flux measurements; and
  in response to detection of the connection joint, track a change in the height of the travelling block based on the block position measurements.

2. The apparatus of claim 1 wherein the magnet and the sensor are disposed at the drill rig such that the drill string moves adjacent the magnet and the sensor while the drill string is moved into and out of the wellbore.

3. The apparatus of claim 1 wherein the magnet and the sensor are disposed below a rig floor of the drill rig such that the drill string moves adjacent the magnet and the sensor while the drill string is moved into and out of the wellbore.

4. The apparatus of claim 1 wherein the magnet and the sensor are connected with and/or supported by a rotating control device (RCD) such that the drill string moves adjacent the magnet and the sensor while the drill string is moved through the RCD.

5. The apparatus of claim 1 wherein the magnet and the sensor are connected with and/or supported by a blowout preventer (BOP) such that the drill string moves adjacent the magnet and the sensor while the drill string is moved through the BOP.

6. The apparatus of claim 1 wherein:
 the magnet is a first magnet of a plurality of magnets distributed in a generally circular pattern;
 the sensor is a first sensor of a plurality of sensors distributed in a generally circular pattern; and
 the magnets and the sensors are disposed at the drill rig such that the drill string moves between the magnets and the sensors while the drill string is moved into and out of the wellbore.

7. The apparatus of claim 1 wherein the processing device is operable to detect the connection joint when the magnetic flux measurements are indicative of an increase in wall thickness of the drill string.

8. The apparatus of claim 1 wherein the processing device is operable to detect a location of the connection joint by determining a location along the drill string at which the magnetic flux measurements are indicative of a decrease of the amount of magnetic flux that leaked from the drill string.

9. The apparatus of claim 1 wherein
 the processing device is operable to:
  determine a stickup height of the drill string based on the known height of the magnetic flux sensor and the tracked change in the height of the travelling block after the detection of the connection joint.

10. The apparatus of claim 9 wherein the processing device is operable to output the determined stickup height to cause an iron roughneck to move to the stickup height to break out the detected connection joint or make up another connection joint.

11. The apparatus of claim 9 wherein, while the drill string is being moved out of the wellbore, the processing device is operable to:
 determine the stickup height of the drill string by subtracting the known height of the magnetic flux sensor from the tracked change in the height of the travelling block after the detection of the connection joint.

12. The apparatus of claim 9 wherein, while the drill string is being moved into the wellbore, the processing device is operable to:
 determine the stickup height of the drill string by subtracting the predetermined known height of the magnetic flux sensor and the tracked change in the height of the travelling block after the detection of the connection joint from a measured length of an uppermost drill pipe of the drill string.

13. The apparatus of claim 9 wherein:
 the structure of the drill rig comprises a rig floor of the drill rig;
 the block position measurements are indicative of the height of the travelling block with respect to the rig floor; and
 the stickup height is or comprises a respective height of an upper end of the drill string with respect to the rig floor.

14. The apparatus of claim 1 wherein
 the processing device is further operable to:
  determine a position of the connection joint based on the known height of the magnetic flux sensor and the block position measurements; and
  before a blowout preventer (BOP) is operated, cause the hoisting system to move the drill string such that the detected connection joint is outside of the BOP.

15. The apparatus of claim 1, wherein, in response to the detection of the connection joint, the processing device is operable to initiate a distance counter to track the change in the height of the travelling block that occurs after the detection of the connection joint and based on the block position measurements.

16. A method comprising:
 while a drill string is moved into and out of a wellbore:
  transmitting, with a magnet, magnetic flux through a portion of the drill string;
  measuring, with a sensor, leakage of the magnetic flux along the portion of the drill string;
  measuring, with a block position sensor, block position measurements indicative of a height of a travelling block of a hoisting system;
  detecting, with a processing device, a connection joint between adjacent drill pipes of the drill string based on a change in the measured leakage of the magnetic flux; and
  tracking, with the processing device and in response to detecting the connection joint, a change in the height of the travelling block based on the block position measurements.

17. The method of claim 16 wherein:
 the magnet is a first magnet of a plurality of magnets distributed in a generally circular pattern;
 the sensor is a first sensor of a plurality of sensors distributed in a generally circular pattern; and the method comprises moving the drill string between the magnets and the sensors while the drill string is moved into and out of the wellbore.

18. The method of claim 16 wherein:

the sensor is disposed at a known height; and the method further comprises:

determining, with the processing device, a stickup height of the drill string based on the known height of the sensor and the tracked change in the height of the travelling block after detecting of the connection joint; and causing an iron roughneck to move to the determined stickup height to break out the detected connection joint or make up another connection joint.

19. The method of claim 15 wherein:

the sensor is disposed at a known height; and the method further comprises:

determining, with the processing device, a position of the connection joint based on the known height of the magnetic flux sensor and the block position measurements; and before a blowout preventer (BOP) is operated, causing the drill string to move such that the detected connection joint is outside of the BOP.

20. An apparatus comprising:

a plurality of magnets disposed with respect to a rig floor of a drill rig such that a drill string can move into and out of a wellbore between the magnets, wherein the magnets are operable to transmit a magnetic flux through a portion of the drill string while the drill string is moved into and out of the wellbore;

a magnetic flux sensor disposed such that the drill string can move into and out of the wellbore adjacent the magnetic flux sensor, wherein the magnetic flux sensor is operable to facilitate magnetic flux measurements indicative of an amount of magnetic flux that leaked from the portion of the drill string through which the magnetic flux is transmitted while the drill string is moved into and out of the wellbore;

a block position sensor operable to facilitate block position measurements; and a processing device comprising a processor and a memory storing a computer program code, wherein the processing device is operable to:

receive the magnetic flux measurements;

detect a connection joint between adjacent drill pipes of the drill string based on the magnetic flux measurements;

receive the block position measurements; and determine a stickup height of the drill string based on a predetermined height of the magnetic flux sensor and the block position measurements.

\* \* \* \* \*